United States Patent Office 3,480,381
Patented Nov. 25, 1969

3,480,381
CELLULOSE-HALOMETHYL METHYL SULFIDE
REACTION PROCESS AND PRODUCT
John V. Beninate, Gretna, Eileen K. Boylston, New
Orleans, and George L. Drake, Jr., Metairie, La.,
assignors to the United States of America as represented by the Secretary of Agriculture
No Drawing. Filed Mar. 10, 1966, Ser. No. 533,267
Int. Cl. D06m *13/08, 13/28*
U.S. Cl. 8—120                              7 Claims

ABSTRACT OF THE DISCLOSURE

The disclosed invention relates to sulfur containing cellulose ethers, having reducing properties, prepared by reacting halogenated alkyl or aryl sulfides with cellulose. After use in an oxidation-reduction process, the oxidized cellulose can be regenerated to its original reducing state.

---

A non-exclusive, irrevocable, royalty-free license in the invention herein described, throughout the world for all purposes of the United States Government, with the power to grant sublicenses for such purposes, is hereby granted to the Government of the United States of America.

The cellulose derivatives which are the subject of our invention are prepared by the use of an unsymmetrical sulfide in an alkaline solution. This unsymmetrical sulfide is prepared by replacing certain labile hydrogen atoms in an alkyl or an aryl sulfoxide with chlorine, bromine, or iodine atoms which have been abstracted from certain organic compounds or certain inorganic compounds that contain a phosphorous halogen bond.

During the reaction, tervalent phosphorous atoms are oxidized to a higher oxidation state by the attachment of oxygen, while halogen atoms attached to carbon or phosphorous atoms are replaced by hydroxyl groups. At the same time the halogen atom so replaced combines with the reagent to produce the unsymmetrical sulfide. This method of producing unsymmetrical sulfides is preferred to present available processes.

Dimethyl sulfoxide and diphenyl sulfoxide are typical examples of alkyl and aryl sulfoxides which have been found to be especially effective oxidizing agents.

The reaction is preferably carried out under nonaqueous conditions and therefore provides a method of hydrolysis of halogen compounds, i.e. replacement of halogen by hydroxyl, which may be conveniently employed where the normal methods of aqueous hydrolysis must be avoided, e.g., with compounds containing other reactive centers which would be affected by aqueous hydrolytic agents.

The unsymmetrical sulfides also may be prepared by the hydrolysis of organic compounds containing labile halogen, e.g. cyanuric chloride, and also inorganic compounds such as mono- and di-substituted chlorophosphines and also the 6-membered or 8-membered cyclophosphazenes bearing halogen substituents. Other organic compounds containing labile halogen may also be used, e.g. systems such as the 2- and 4-chloro-pyridines,1-chloro-2:4-dinitro benzene and others.

Dimethyl sulfoxide is the preferred oxidizing agent being itself converted into methyl chloromethyl sulfide which at the present time can only be prepared by expensive and undesirable methods.

For the reaction described, dimethyl sulfoxide, B.P. 190°, was purified by fractional distillation from crushed barium oxide. All reactions were carried out under an atmosphere of nitrogen. Temperatures are centigrade degrees.

Example 1

Dimethyl sulfoxide (15.6 g., 0.2 mole) was added slowly (½ hr.) to diphenylchlorophosphine (22.05 g., 0.1 mole). A vigorous exothermic reaction took place, and dimethyl sulfide was evolved and collected in a cold trap (−80°). Colorless crystals appeared, and precipitation was completed by addition of dry ether (50 ml.). The crystals were separated by filtration and identified as diphenylphosphinic acid (20.5 g., 94%), B.P. 194°. (Found: C, 65.6; H, 5.2; P, 13.5. Calc. for $C_{12}H_{11}O_2P$: C, 66.15; H, 5.05; P, 14.2%.) Fractional distillation of the filtrate gave chloromethyl methyl sulfide (8.0 g., 83%), B.P. 107–110°/760 mm. Temperatures are centigrade degrees.

$$Ph_2PCl + 2Me_2SO \rightarrow Ph_2PO_2H + Me_2S + MeSCH_2Cl$$

Example 2

By proceeding in a manner corresponding to that described in Example 1, reaction of dimethyl sulfoxide (23.4 g., 0.3 mole) with phenyldichlorophosphine (17.9 g., 0.1 mole) gave phenylphosphonic acid (11.5 g., 73%), M.P. 148–150°, dimethyl sulfide (6.0 g., 97%), B.P. 36–38°, and chloromethyl methyl sulfide (18.5 g., 96%), B.P. 107–110°.

$$PhPCl_2 + 3Me_2SO \rightarrow PhPO(OH)_2 + Me_2S + 2MeSCH_2Cl$$

Example 3

Dimethyl sulfoxide (46.8 g., 0.6 mole) dissolved in methylene chloride (50 ml.) was added slowly to a solution of hexachlorocyclotriphosphazene (35.5 g., 0.1 mole) in methylene chloride (100 ml.). A vigorous reaction took place immediately, with the precipitation of a colorless solid. The mixture was stirred (3 hrs.) and filtered. The solid product was washed successively with methylene chloride, ether, and pentane, and identified as tris(hydroxyoxo)cyclotriphosphazane-chloromethyl methyl sulfide. (Found: C, 8.5; H, 3.2; Cl, 10.6; N, 11.1; P, 25.6; S, 9.3. $C_2H_{11}ClN_3O_6P_3S$ requires C, 7.2; H, 3.3; Cl, 10.6; N, 12.7; P, 27.8; S, 9.6%.) Fractional distillation of the filtrate gave chloromethyl methyl sulfide, B.P. 107–110°.

$$N_3P_3Cl_6 + 6Me_2SO \rightarrow N_3P_3O_6H_6, MeSCH_2Cl + 5MeSCH_2Cl$$

Example 4

Dimethyl sulfoxide (23.0 g., 0.3 mole) dissolved in methylene chloride (20 ml.) was added slowly (½ hr.) to a stirred solution of cyanuric chloride (18.5 g., 0.1 mole) in methylene chloride. Reaction occurred immediately, the mixture became pale yellow, and a solid precipitate was formed. The mixture was boiled under reflux, cooled, and filtered. The solid product was identified as cyanuric acid (11.6 g., 83.5%), M.P. greater than 360°. Fractional distillation of the filtrate gave chloromethyl methyl sulfide (21.0 g., 73%), B.P. 107–110° (found: C, 24.8; H, 5.1; S, 34.2%; M.W., 95 Calc. for $C_2H_5ClS$: C, 24.95; H, 5.2; S, 33.4%; M.W., 96.5), and a black tarry residue remained.

$$3Me_2SO + N_3C_3Cl_3 \rightarrow N_3C_3O_3H_3 + 3MeSCH_2Cl$$

Example 5

Dimethyl sulfoxide (19.5 g., 0.25 mole) was added slowly (¼ hr.) to a solution of benzoyl chloride (35.1 g., 0.25 mole) in methylene chloride (25 ml.) at 0°. Vigorous reaction with precipitation of a colorless solid occurred. The mixture was stirred (3 hr.) at room temperature. The solid was separated by filtration and identified as benzoic acid, M.P. and mixed M.P. 120–122°. Fractional distillation of the filtrate gave chloromethyl sulfide (22.5 g., 94%), B.P. 106–109°. Benzoic acid was obtained from the distillation residue (total yield 30.4 g., 99.9%).

$$PhCOCl + Me_2SO \rightarrow PhCO_2H + MeSCH_2Cl$$

Example 6

Dimethyl sulfoxide (31.2 g., 0.4 mole) was added slowly to a solution of octachlorocyclotetraphosphazene (23.2 g., 0.05 mole) in methylene chloride (250 ml.). A vigorous exothermic reaction took place, and a colorless solid precipitated. The reaction mixture was stirred (3 hr.) and filtered. Fractional distillation of the filtrate gave chloromethyl methyl sulfide (30.0 g.). The solid product (21.3 g.) was identified as an addition compound of tetrakis(hydroxyoxo)cyclotetraphosphazane which gave the dihydrate of the parent acid on treatment with water.

$N_4P_4Cl_8 + 8Me_2SO \longrightarrow$

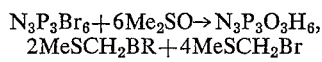

Example 7

Dimethyl sulfoxide (3.1 g., 0.04 mole) dissolved in methylene chloride (20 ml.) was added slowly (½ hr.) to a stirred solution of hexabromoclotriphosphazene (4.0 g., 0.0065 mole) in methylene chloride (25 ml.). A vigorous reaction took place, a pale yellow solid precipitated, and the mixture was boiled under reflux (½ hr.), cooled, and filtered. The solid product was washed successively with methylene chloride, ether, and pentane, and identified as tris(hydroxyoxo)cyclotriphosphazane-bis (bromomethyl methyl sulfide) (3.0 g., 94%). (Found: C, 11.25; H, 3.8; Br, 26.65; N, 7.7; P, 18.1; S, 12.1

$C_4H_{16}Br_2N_3O_6P_3S$ requires C, 9.25; H, 3.1; Br, 31.0; N, 8.1; P, 17.95; S, 12.35.) Decomposition occurred above 270° on attempted fractional distillation of the filtrate.

$N_3P_3Br_6 + 6Me_2SO \rightarrow N_3P_3O_3H_6,$
$2MeSCH_2BR + 4MeSCH_2Br$

The halomethyl methyl sulfides prepared by any of the above methods may be used to treat cellulosic material (webbing) comprising raw, scoured, scoured and bleached, or mercerized cotton; viscose; cuprammonium; wood cellulose, and the like. The particular cellulose required is one that contains free hydroxyl groups. We prefer to use cotton webbing, either woven or nonwoven.

The amount of chloromethyl methyl sulfide employed may range from one to three moles per mole of anhydroglucose units.

The reaction is carried out in an alkaline medium at a temperature ranging from about 25° to 180° C. for about three hours to four minutes, the higher temperature requiring the shorter time.

It is also within the scope of our invention to convert the dimethyl sulfoxide into bis(halomethyl) sulfide ($XCH_2SCH_2X$ where X is halogen) prior to reacting with the cellulosic material.

The cellulosic material treated with chloromethyl methyl sulfide as shown in Example 9 below would be a chemically modified cotton called cellulose methyl thiomethyl ether (Cell-$OCH_2SCH_3$) or the methylthiomethyl ether of cellulose. This derivative has reducing properties as shown in Examples 10, 11, and 12 and could be used in practical applications in aqueous systems containing components such as bromine, chlorine or iodine, which could be reduced in order to make the system useful for certain specific applications. A continuous-belt system made up of the treated fabric would be passed through the liquid to be reduced, and after the reduction step is completed, the treated fabric belt, which at this point is in its oxidized form, would pass through a reducing system, such as an aqueous sodium borohydride, and thereby be regenerated back to the sulfide. The treated fabric belt is then ready to cycle through the liquid for a subsequent reduction step.

Reducing temperatures ranging from about 25° C. to about three hours to four minutes at a pH greater than 7 are satisfactory for reducing the oxidized cellulosic material.

If desired, bis(chloromethyl) sulfide may be reacted with cellulose to form cellulose chloromethylthiomethyl ether when only one chlorine atom combines with the OH of the anhydroglucose unit. When both chlorine atoms of the bis(chloromethyl) sulfide ($ClCH_2 \cdot S \cdot CH_2 \cdot Cl$) combine, thiobis (cellulose methyl ether) formed.

Example 8

A swatch of desized, scoured and bleached cotton cloth was immersed in a solution containing 5 parts KOH and 95 parts $C_2H_5OH$ and squeezed through pad rolls to remove excess liquid, then allowed to air dry. The sample was placed around the outside surface of a stainless steel beaker and swabbed with an alcohol solution containing 10 parts $ClCH_2SCH_3$ by weight. The beaker was suspended over a steam cone allowing the sample to be in intimate contact with steam for one-half hour to accelerate the reaction. The sample was washed in hot water and dried. The treated cotton was analyzed and contained 0.10% sulfur, showing that the free hydroxyl groups in the anhydroglucose units have reacted with the chloromethyl methyl sulfide.

Example 9

A swatch of cotton cloth was placed around the outside surface of a stainless steel beaker and was swabbed with a solution containing 5 parts NaOH and 95 parts $H_2O$. The sample was dried, and swabbed with approximately 100% liquid $ClCH_2SCH_3$. The fabric was cured for ½ hour using steam to heat the metal surface. After curing, the sample was washed in hot water and dried. The treated cotton was analyzed and contained 0.19% sulfur, showing that the free hydroxyl groups in the anhydroglucose units have reacted with the chloromethyl methyl sulfide.

Example 10

One gram of 80 x 80 cotton cloth treated as shown in Example 9 was immersed in a flask containing 15 ml. of dilute, slightly colored bromine water. To another flask containing 15 ml. of bromine water was added 1 gram of untreated printcloth. Both samples remained in these solutions for 20 minutes with occasional shaking. The bromine water solution containing the treated fabric was decolorized, and that containing the untreated fabric was not, indicating that the treated fabric had reducing properties and had reduced the bromine to the colorles bromide.

Example 11

One-half gram of 80 x 80 cotton cloth treated by the procedure of Example 9, was immersed in 10 ml. of Tollens' reagent ($Ag(NH_3)_2OH$). The solution was warmed slightly, which resulted in the treated fabric becoming very dark brown in color, and the appearance of small particles of silver floating on the surface of the solution. This indicated that the treated fabric reduced Tollens' Reagent resulting in the formation of free silver. An untreated fabric immersed in Tollen's reagent with similar slight warming was only slightly discolored and small particles of silver were not observed in the solution.

Example 12

One gram of 80 x 80 cotton cloth treated by the procedure of Example 9, was immersed in a flask, containing 15 ml. of dilute bromine water. After 20 minutes with occasional shaking, the bromine solution was decolorized, indicating reduction of bromine to bromide and simultaneous oxidation of the cellulosic material. This oxidized fabric was then removed from the solution, washed, and reduced in a hot solution (80°–90° C.) of (about 1 to 3%) sodium borohydride ($NaBH_4$) for 20 minutes. After washing the reduced fabric, it was again immersed in another beaker of bromine water solution for 20 minutes, with shaking. The bromine water solution was again decolorized indicating reduction of the bromine to bromide. This shows that the treated fabric can be regenerated from its oxidized form back to its reduced form to be used again in subsequent reduction cycles.

When the procedure of Example 9 is repeated using bromomethyl methyl sulfide or iodomethyl methyl sulfide and the treated fabrics used in place of the chloromethyl methyl sulfide in the above example, generally, similar results are obtained.

We claim:
1. A process for converting cellulosic material into cellulose methyl thiomethyl ether useful as a reducing agent in aqueous media which process comprises:
   (a) impregnating the cellulosic material with a dilute, aqueous solution of alkali;
   (b) drying the impregnated material;
   (c) treating the dried, alkali-impregnated cellulosic material with an alcoholic solution of a halomethyl methyl sulfide in which sulfide the halo substituent is a halogen atom selected from the group consisting of chlorine, bromine, and iodine, at a temperature ranging from about 25° to 180° C. for about 3 hours to 4 minutes;
   (d) removing the unreacted halomethyl methyl sulfide by washing in hot water; and
   (e) drying the thus treated cellulosic material.
2. The product of claim 1.
3. The process defined in claim 1 wherein the cellulosic material is selected from the group consisting of raw scoured, scoured and bleached, and mercerized cotton; viscose rayon; cuprammonium rayon; and wood cellulose.
4. The process defined in claim 1 wherein the halomethyl methyl sulfide ranges from about 1 to 3 moles per mole anhydroglucose units in the cellulose molecule.
5. The process defined in claim 1 wherein the cellulosic material is woven or nonwoven cotton webbing.
6. The process defined in claim 1 wherein the alkali-treated cellulosic material is impregnated with an alcoholic solution of a halomethyl methyl sulfide and then heated in an atmosphere of steam at about 80–95° C. for about 20 to 40 minutes.
7. The process defined in claim 1 wherein the alkali-treated cellulosic material is impregnated with a halomethyl methyl sulfide and then heated in hot air at about 100 to 180° C. for about 50 to 4 minutes.

References Cited

UNITED STATES PATENTS 2,580,351   12/1951   Grassie _____ 260—231

LEON D. ROSDOL, Primary Examiner

J. D. WELSH, Assistant Examiner

U.S. Cl. X.R.

8—129; 117—143; 260—215, 231